April 6, 1948. W. N. GITTINGS 2,439,247
PROTECTIVE ARRANGEMENT FOR TRANSLATING DEVICES
Filed May 1, 1945
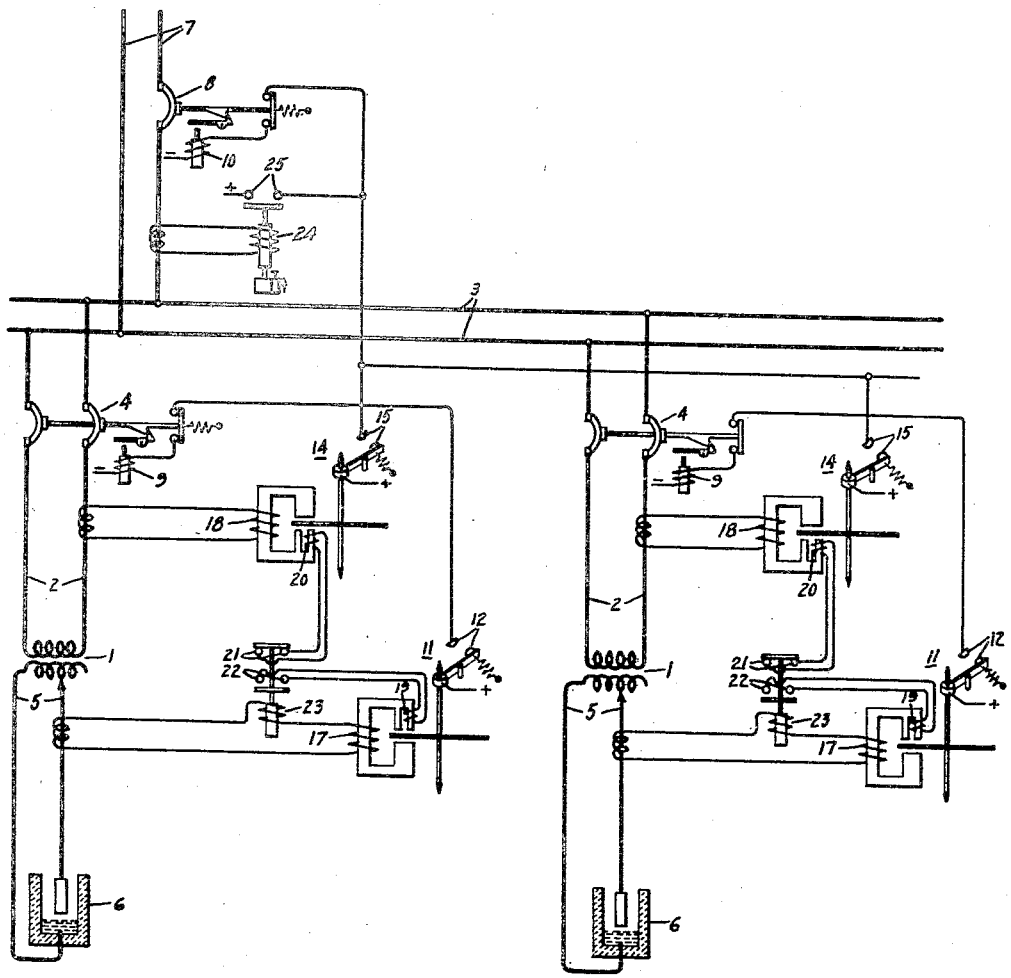
Inventor:
William N. Gittings,
by Harry E. Dunham
His Attorney.

Patented Apr. 6, 1948

2,439,247

UNITED STATES PATENT OFFICE 2,439,247

PROTECTIVE ARRANGEMENT FOR TRANSLATING DEVICES

William N. Gittings, Oakmont, Pa., assignor to General Electric Company, a corporation of New York Application May 1, 1945, Serial No. 591,275

7 Claims. (Cl. 175—294)

1

My invention relates to protective arrangements for translating devices and particularly to translating devices such as power transformers which have an input or supply circuit and an output or load circuit. In such protective arrangements, it is sometimes desirable to provide in the input circuit a circuit interrupter which is opened in response to the overcurrent that flows in the input circuit when a fault occurs in the input circuit or in the translating device but which is not opened in response to the same value of input circuit current when that current is due to some predetermined condition of the output circuit, such as a transient load condition. For example, when a variable ratio transformer is used to supply a load such as an electric arc furnace, the load impedance may be decreased to such a low value by short circuiting the furnace electrodes while the transformer connections are such that the transformer reactance is a minimum as to cause the input current to exceed the value which flows when a fault occurs across the output terminals of the transformer while its connections are such that its reactance is a maximum. This value of input current, however, is much lower than the fault current that flows in the input circuit when a fault occurs in the input circuit or in the transformer windings because the fault current in the latter case is not limited by the full reactance of the transformer windings. Therefore, it is the practice to provide two circuit interrupters in series in the input or supply circuit of such a transformer. One of these circuit interrupters, commonly known as a switching interrupter, is of a suitable design to interrupt any input current which may flow as a result of an abnormal load condition, such as a short circuiting of the furnace electrodes, but is not capable of safely interrupting the large current that may flow when a fault occurs in the input circuit or in the transformer windings. The other circuit interrupter, called a back-up interrupter, is of suitable construction to interrupt the maximum current that may flow in response to a fault in the input circuit or in the transformer windings. In view of the fact that the minimum input fault current at which it is desirable to open the back-up interrupter may be below the value which the switching interrupter can safely interrupt and which may flow in the input circuit under certain abnormal transient load conditions, it is desirable not to effect the opening of the back-up interrupter under such load conditions but instead it is desirable to have the input circuit interrupt-

2 ed by the switching interrupter under such abnormal load conditions. This is particularly desirable in electric systems in which the back-up interrupter is connected in series wtih a plurality of parallel connected transformer input circuits, so as to avoid an unnecessary interruption of current to the load circuits which are not overloaded.

One object of my invention is to provide an improved protective arrangement for a translating device having an input circuit and an output circuit whereby a predetermined protective operation, which is normally effected in response to the current in the input circuit exceeding a predetermined value, is prevented from being effected in response to such a value of input circuit current when it is due to an abnormal load condition.

Another object of my invention is to provide an improved protective arrangement for a translating device having an input circuit and an output circuit whereby a circuit interrupter in the input circuit is opened in response to a fault in the input circuit, but when an overcurrent occurs in the output circuit, the opening of the circuit interrupter is delayed to allow some other protective device to function in response to the overcurrent.

A further object of my invention is to provide an improved protective arrangement for a plurality of translating devices, each of which has an input circuit and an output circuit whereby a circuit interrupter in series with all of the input circuits is opened in response to a fault on any one of the input circuits but is not opened until after a suitable protective device, such as another circuit interrupter in the input circuit of the associated translating device, has had time to operate and has failed to do so in response to a predetermined overcurrent in the output circuit of a translating device.

My invention will be better understood from the following description when taken in connection with the accompanying drawing, the single figure of which diagrammatically illustrates an embodiment of my invention in connection with a protective arrangement for a plurality of electric arc furnace transformers, and its scope will be pointed out in the appended claims.

Referring to the drawing, a plurality of variable ratio transformers 1 are shown, each of which is provided with an input circuit 2 and with an output circuit 5 which is connected to the electrodes of an electric arc furnace 6. Each input circuit 2 includes a switching interrupter 4 individual thereto, a supply bus 3 common to all of the input circuits and a supply circuit 7 which is connected to the supply bus 3 by a back-up circuit interrupter 8. Therefore, in each input circuit the associated individual switching interrupter 4 is connected in series with the common backup interrupter 8.

Suitable means, examples of which are well known in the art, may be provided for varying the ratio of transformation of each transformer 10 and for varying the relative positions of the electrodes of each furnace so that the current supplied to each individual furnace may be individually adjusted. Since the details of such adjusting means form no part of my present invention and are also well known in the art, they have been omitted from the drawing in order to simplify the disclosure. Also, in order not to complicate the disclosure, I have shown my invention in connection with a single phase circuit, but it will be evident to anyone skilled in the art that the invention is equally applicable to polyphase circuits.

The circuit interrupters 4 are shown as being of the well-known latched closed type and are arranged to be opened in response to the energization of an associated trip coil 9. The circuit interrupter 8 is shown as being of the latched closed type and as being arranged to be opened in response to the energization of an associated trip coil 10.

Each switching interrupter 4 is normally arranged to interrupt the associated input circuit 2 in response to a predetermined overcurrent in the output circuit 5 of the associated transformer 1. As shown in the drawing, this result is accomplished by connecting a time overcurrent relay 11 in each output circuit 5 and having the contacts 12 of the overcurrent relay 11 complete an energizing circuit for the trip coil 9 of the associated switching interrupter 4 when the output current exceeds a predetermined value.

The back-up interrupter 8 is normally arranged to disconnect the supply bus 3 from the supply circuit 7 in response to a predetermined overcurrent in any one of the input circuits 2. As shown in the drawing, this result is accomplished by connecting a short time overcurrent relay 14 in each input circuit 2 and having the contacts 15 of each overcurrent relay 14 complete an energizing circuit for the trip coil 10 of the back-up interrupter 8 when the current in the associated input circuit 2 exceeds a predetermined value.

Each overcurrent relay 14 is set to effect the opening of the back-up interrupter 8 in response to a fault in the input circuit 2 of the associated transformer 1 and in that portion of the associated output circuit 5 between the associated transformer 1 and the point where the associated overcurrent relay 11 is connected. In order to accomplish this result, each overcurrent relay 14 has to be set so that it responds to the current occurring in the associated input circuit 2 when a fault in the associated output circuit 5 at the point where the associated overcurrent relay 11 is connected and the connections of the associated transformer 1 are such that its reactance is a maximum. Consequently, the setting of an overcurrent relay 14 may be so low that it may be operated by transient load conditions, such as a temporary short circuiting of the furnace electrodes, when the connections of the associated transformer are such that its reactance is a minimum. In order to prevent such an operation of the overcurrent relays 14, I provide an arrangement for preventing an overcurrent relay 14 from effecting the opening of the back-up interrupter 8 while the current in the associated output circuit 5 between the point where relay 11 is connected and the furnace 6 is above a predetermined value. This result is accomplished in the arrangement shown in the drawing by employing shaded pole induction type relays 11 and 14 which are respectively provided with operating windings 17 and 18 and shading coils or windings 19 and 20. The operating windings 17 are respectively energized in response to the currents in the associated output circuits 5, and the operating windings 18 are respectively energized in response to the currents in the associated input circuits 2.

The circuit of the shading coil 20 of each overcurrent relay 14 is normally completed, and the circuit of the shading winding 19 of the associated overcurrent relay 11 is normally open at the contacts 21 and 22 respectively of an associated instantaneous overcurrent relay 23 which is responsive to the current in the associated output circuit 5. As shown, the operating winding at each instantaneous overcurrent relay 23 is connected in series with the operating winding 17 of the associated overcurrent relay 11. Each overcurrent relay 23 being instantaneous in action has a shorter operating time than the normal operating time of the associated overcurrent relay 14 so that, when an overcurrent occurs in any transformer output circuit, the associated overcurrent relay 11 is rendered operative to effect the opening of the associated switching interrupter 4, and the overcurrent relay 14 in the associated transformer input circuit is rendered inoperative to effect the opening of the back-up interrupter 8. However, if an overcurrent occurs in any transformer input circuit 2 or that portion of the output circuit 5 between the transformer 1 and the point where relay 11 is connected and it is not accompanied by an overcurrent in that portion of the associated transformer output circuit 5 at the point where the relay 11 is connected, as is the case when a fault occurs on an input circuit, the overcurrent relay 14 associated with the input circuit in which the overcurrent occurs operates to effect the opening of the back-up interrupter 8.

Since each time overcurrent relay 11 has a time setting which is sufficient to allow the furnace electrode adjusting means to function properly, an overcurrent condition in the output circuit of the transformer is usually corrected by the electrode regulator and results in the restoration of the associated instantaneous overcurrent relay 23, which preferably has a high dropout setting, to its normal position before the associated time overcurrent relay 11 completes its timing operation. Under such conditions, it is desirable to have the overcurrent relay 11 return to its normal position as quickly as possible so that a rapid succession of short overcurrent conditions in an output circuit cannot effect the opening of the associated switching interrupter 4. The arrangement shown in the drawing accomplishes this result because as soon as an overcurrent relay 23 opens its contacts 22, the operating torque of the associated time overcurrent relay 11 is reduced to zero thereby causing it to reset as rapidly as possible.

In order to effect the opening of the back-up interrupter 8 in response to faults on supply bus 3 or the structure of the switching interrupters 4, I also connect a suitable time delay overcurrent relay 24 in the supply circuit 7 and connect the contacts 25 of this overcurrent relay 24 so that they complete an energizing circuit for the trip coil 10 of the circuit interrupter 8 in response to the current in the supply circuit 7 remaining above a predetermined value for a predetermined time. The overcurrent and time delay adjustments of relay 24 are set so that in response to faults occurring in the input circuits beyond the points where the operating windings 18 are connected thereto it will not operate prior to the operation of relays 14.

It will be evident from the above description that in the particular embodiment of the invention shown in the drawing, I have provided an arrangement for effecting an opening of the back-up circuit interrupter 8 when an overcurrent occurs in any transformer input circuit and the overcurrent is not accompanied by an overcurrent in the associated transformer output circuit. The opening of the back-up interrupter 8, however, is prevented when an overcurrent in any transformer input circuit is accompanied by a corresponding overcurrent in the associated transformer output circuit.

While I have shown one particular embodiment of my invention in connection with a variable reactance transformer supplying current to an electric arc furnace, it is evident that my invention has many other applications where it may be desirable to render ineffective the opening of an overcurrent circuit interrupter in the input circuit of a translating device when a predetermined overcurrent condition occurs at the same time in the output circuit of the translating device.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. An protective arrangement for a translating device having an input circuit and an output circuit and a circuit interrupter in the input circuit comprising means for effecting the opening of the interrupter only in response to the current in the input circuit exceeding a predetermined value for a predetermined time, and means responsive to the current in the output circuit exceeding a predetermined value for rendering said first mentioned means ineffective to open the circuit interrupter.

2. A protective arrangement for a translating device having an input circuit and an output circuit and a circuit interrupter in the input circuit comprising means for effecting the opening of the interrupter in response to the current in the input circuit exceeding a predetermined value for a predetermined time, means responsive to the current in the output circuit exceeding a predetermined value for rendering said first mentioned means ineffective to open the circuit interrupter, and means responsive to the current in the output circuit exceeding a predetermined value for a predetermined time for interrupting said input circuit.

3. A protective arrangement for a translating device having an input circuit and an output circuit and two circuit interrupters connected in series in said input circuit comprising means for effecting the opening of one of the interrupters in response to the current in the input circuit exceeding a predetermined value for a predetermined time, means responsive to the current in said output circuit exceeding a predetermined value for rendering said first mentioned means ineffective to open said one of the interrupters, and means for effecting the opening of the other circuit interrupter in response to the current in the output circuit exceeding a predetermined value for a predetermined time which is longer than the time it takes said first mentioned output circuit current responsive means to render said first mentioned means ineffective.

4. A protective arrangement for a translating device having an input circuit and an output circuit and two circuit interrupters connected in series in said input circuit comprising an overcurrent relay of the shaded pole induction type for controlling the opening of one of said interrupters and including an operating winding connected to the input circuit and a normally closed shaded pole winding, a second overcurrent relay of the shaded pole induction type for controlling the opening of the other interrupter and including an operating winding connected to the output circuit and a normally open shaded pole winding, and means including a third overcurrent relay connected to the output circuit for opening said normally closed shaded pole winding and closing said normally open shaded pole winding in response to the current in said output circuit exceeding a predetermined value.

5. A protective arrangement for a translating device having an input circuit and an output circuit and two circuit interrupters connected in series in said input circuit comprising an overcurrent relay connected to the input circuit for controlling the opening of one of said circuit interrupters, a second overcurrent relay of the shaded pole induction type for controlling the opening of the other of said circuit interrupters and including an operating winding connected to the output circuit and a normally open shaded pole winding, and means including a third overcurrent relay connected to the output circuit for preventing said first mentioned overcurrent relay from controlling the opening of said one of said circuit interrupters and for closing said normally open shaded pole winding in response to the current in said output circuit exceeding a predetermined value.

6. In a protective arrangement for a translating device having an input circuit and an output circuit, the combination of an overcurrent relay connected to the input circuit and normally arranged to effect a predetermined control operation only in response to the current in the input circuit exceeding a predetermined value, and means responsive to a predetermined current in the output circuit for preventing said overcurrent relay from effecting said predetermined control operation.

7. In a protective arrangement for a translating device having an input circuit and an output circuit, the combination of means for effecting a predetermined control operation in response to the current in the input circuit exceeding a predetermined value including an overcurrent relay of the shaded pole induction type having an operating winding connected to the input circuit and a normally closed shaded pole winding, and means responsive to the current in the output circuit exceeding a predetermined value for interrupting said normally closed shaded pole winding.

WILLIAM N. GITTINGS.

REFERENCES CITED

The following references are of record in the file of this patent:

UNITED STATES PATENTS

| Number | Name | Date |
|---|---|---|
| 1,204,503 | Smith | Nov. 14, 1916 |
| 1,787,181 | Traver | Dec. 30, 1930 |
| 2,376,808 | Ratz | May 22, 1945 |